(12) United States Patent
Yang et al.

(10) Patent No.: US 12,363,574 B2
(45) Date of Patent: Jul. 15, 2025

(54) BEAMFORMING REPORT TRANSMISSION METHOD, COMMUNICATION NODE AND COMPUTER- READABLE STORAGE MEDIUM

(71) Applicant: ZTE CORPORATION, Guangdong (CN)

(72) Inventors: Dan Yang, Guangdong (CN); Nan Li, Guangdong (CN); Ning Wei, Guangdong (CN); Bo Sun, Guangdong (CN); Zhiqiang Han, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 94 days.

(21) Appl. No.: 17/767,632

(22) PCT Filed: Nov. 20, 2020

(86) PCT No.: PCT/CN2020/130426
§ 371 (c)(1),
(2) Date: Apr. 8, 2022

(87) PCT Pub. No.: WO2021/068990
PCT Pub. Date: Apr. 15, 2021

(65) Prior Publication Data
US 2024/0107350 A1 Mar. 28, 2024

(30) Foreign Application Priority Data
Oct. 8, 2019 (CN) .......................... 201910949874.4

(51) Int. Cl.
*H04W 24/10* (2009.01)
*H04B 17/309* (2015.01)
(Continued)

(52) U.S. Cl.
CPC .......... *H04W 24/10* (2013.01); *H04B 17/309* (2015.01); *H04W 72/54* (2023.01); *H04W 84/12* (2013.01)

(58) Field of Classification Search
CPC ..... H04W 24/10; H04W 84/12; H04W 72/54; H04L 5/00; H04L 5/0053; H04L 5/0073; H04B 17/309
See application file for complete search history.

(56) References Cited

U.S. PATENT DOCUMENTS

2016/0183183 A1 6/2016 Zhang et al.
2016/0249366 A1* 8/2016 Seok .................. H04W 72/541
(Continued)

FOREIGN PATENT DOCUMENTS

CN 105532034 A 4/2016
CN 106374984 A 2/2017
(Continued)

OTHER PUBLICATIONS

China Patent Office, First Office Action dated May 1, 2023, for corresponding CN application No. 201910949874.4.
(Continued)

*Primary Examiner* — Redentor Pasia
*Assistant Examiner* — Lalita W Pace
(74) *Attorney, Agent, or Firm* — Li & Cai Intellectual Property (USA) Office

(57) ABSTRACT

The present disclosure provides a beamforming report transmission method, a communication node and a computer-readable storage medium, the beamforming report transmission method includes: receiving, by a first communication node, a beamforming report sent by a third communication node, where the beamforming report includes at least one of a beamforming result or a channel quality measurement
(Continued)

receiving, by a first communication node, a beamforming report sent by a third communication node, where the beamforming report includes a beamforming result and/or a channel quality measurement result between the third communication node and at least one second communication node — S101 result between the third communication node and at least one second communication node.

14 Claims, 4 Drawing Sheets

(51) Int. Cl.
*H04W 72/54* (2023.01)
*H04W 84/12* (2009.01)

(56) References Cited

U.S. PATENT DOCUMENTS

| | | | | |
|---|---|---|---|---|
| 2016/0262050 | A1* | 9/2016 | Merlin | .................. H04L 1/0026 |
| 2017/0111924 | A1* | 4/2017 | Josiam | .................. H04L 5/0085 |
| 2018/0062770 | A1 | 3/2018 | Reial et al. | |
| 2018/0206274 | A1 | 7/2018 | Cherian et al. | |
| 2022/0140879 | A1* | 5/2022 | Liang | .................... H04W 24/10 |
| | | | | 375/267 |
| 2023/0309120 | A1* | 9/2023 | Guo | ....................... H04W 72/12 |

FOREIGN PATENT DOCUMENTS

| | | |
|---|---|---|
| CN | 108781103 A | 11/2018 |
| CN | 109219973 A | 1/2019 |
| CN | 110214422 A | 9/2019 |
| WO | WO2018082628 A1 | 5/2018 |

OTHER PUBLICATIONS

WIPO, International Search Report issued on Jan. 29, 2021.
Interdigital Inc., "Consideration of NR-U Simulation Evaluation on 60 GHz Channels", Apr. 20, 2018, 3GPP TSG RAN WG1 Meeting #92bis R1-1804867.

* cited by examiner receiving, by a first communication node, a beamforming report sent by a third communication node, where the beamforming report includes a beamforming result and/or a channel quality measurement result between the third communication node and at least one second communication node — S101

Fig. 1 sending, by a first communication node, a beamforming report request to at least one third communication node for indicating the third communication node to send a beamforming report including a beamforming result and/or a channel quality measurement result between the third communication node and at least one second communication node to the first communication node — S100 receiving, by the first communication node, the beamforming report sent by the third communication node, where the beamforming report includes the beamforming result and/or the channel quality measurement result between the third communication node and at least one second communication node — S101

Fig. 2

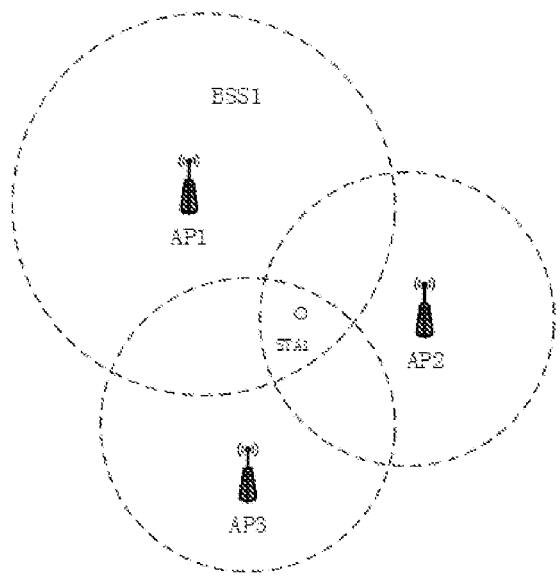

Fig. 3

BEAMFORMING REPORT TRANSMISSION METHOD, COMMUNICATION NODE AND COMPUTER- READABLE STORAGE MEDIUM

The present application claims priority to the Chinese Patent Application No. 201910949874.4 filed with the Chinese Patent Office on Oct. 8, 2019, the entire contents of which are incorporated herein by reference.

TECHNICAL FIELD

The present disclosure relates to the field of communication technologies, and in particular, to a beamforming report transmission method, a communication node and a computer-readable storage medium.

BACKGROUND

With developments of wireless local area network (WLAN) technologies, performance of the WLAN is continuously improved, an expectation for transmission reliability is continuously increased, and the WLAN is desired to support edge users. In the WLAN, common devices include an access point (AP) and a non-access point station (non-AP Station), the AP refers to a device for accessing a WLAN user terminal to a network, and the non-AP Station, also called a station (STA), refers to a WLAN user terminal device. The AP establishes a basic service set (BSS), and the STA associates with the AP through a process of scanning authentication association and communicates with the AP, or the STA communicates with other STAs through the AP. In existing arts, the STA associates with only one AP, the STA performs a channel quality measurement on a channel between the STA and the AP associated with the STA, and feeds back a measurement result to the AP associated the STA, and then, the AP performs a beamforming operation according to the obtained measurement result and sends data to the STA.

In order to improve transmission efficiency, and improve transmission reliability between an AP and an edge STA covered by the AP, in a new generation WLAN, a multi-AP operation is supported, that is, information transmission between multiple APs through an association manner or a cooperation manner is supported. In a network supporting the multi-AP operation, a mechanism for acquiring a beamforming result or a channel quality measurement result between a STA and multiple APs is expected, but a desired acquisition mechanism has not been included in existing arts.

SUMMARY

The present disclosure provides a beamforming report transmission method, a communication node and a computer-readable storage medium, so as to provide a mechanism for acquiring a beamforming result and/or a channel quality measurement result between a STA and a plurality of APs associated and/or unassociated with the STA.

According to a first aspect of the present disclosure, there is provided a beamforming report transmission method applied to a first communication node, the method includes:
receiving, by the first communication node, a beamforming report sent by a third communication node, where the beamforming report includes a beamforming result and/or a channel quality measurement result between the third communication node and at least one second communication node.

According to a second aspect of the present disclosure, there is provided a computer-readable storage medium having a computer program stored thereon, when the computer program is executed by a processor, the processor performs the beamforming report transmission method described above.

According to a third aspect of the present disclosure, there is provided a communication node, the communication node includes:
a first receiving component configured to receive a beamforming report sent by a third communication node, where the beamforming report includes a beamforming result and/or a channel quality measurement result between the third communication node and at least one second communication node.

According to a fourth aspect of the present disclosure, there is provided a beamforming report transmission method applied to a third communication node, the method includes:
sending, by the third communication node, a beamforming report, which includes a beamforming result and/or a channel quality measurement result between the third communication node and at least one second communication node, to a first communication node.

According to a fifth aspect of the present disclosure, there is provided a communication node, the communication node includes:
a second sending component configured to send a beamforming report, which includes a beamforming result and/or a channel quality measurement result between the communication node and at least one second communication node, to a first communication node.

According to the beamforming report transmission method, the communication node and the computer-readable storage medium provided by the present disclosure, the first communication node receives the beamforming report, which includes the beamforming result and/or the channel quality measurement result between at least one third communication node and each second communication node, so that a process in which the third communication node feedbacks the beamforming result and/or the channel quality measurement result between the third communication node and at least one second communication node is implemented.

BRIEF DESCRIPTION OF DRAWINGS

The accompanying drawings illustrated herein are used for providing further understanding to technical solutions of the present disclosure and forming a part of the description. The accompanying drawings and embodiments of the present disclosure are used for explaining the technical solutions of the present disclosure, rather than forming limitation to the technical solutions of the present disclosure.

FIG. 1 is a flowchart of a beamforming report transmission method according to the present disclosure;

FIG. 2 is a flowchart of a beamforming report transmission method according to the present disclosure;

FIG. 3 is a schematic diagram of a wireless network according to the present disclosure;

DETAIL DESCRIPTION OF EMBODIMENTS

Figure 4:
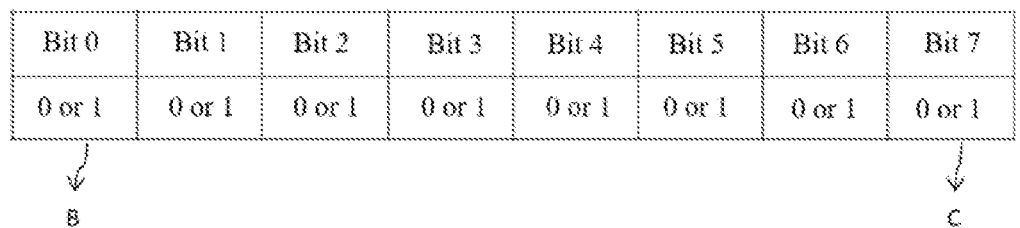
FIG. 4 is a schematic diagram of identification bits of a second communication node according to the present disclosure.

In order to make those skilled in the art better understand the technical solutions of the present disclosure, the present disclosure is further described in detail below with reference to the embodiments and the accompanying drawings. It should be understood that specific implementations described herein are merely intended to illustrate and explain the present disclosure, rather than limiting the present disclosure.

It should be noted that the embodiments of the present disclosure and the technical features in the embodiments may be combined with each other if no conflict is incurred.

The terms used in the embodiments of the present disclosure are for a purpose of describing particular embodiments only, and are not intended to limit the present disclosure. As used in the embodiments of the present disclosure and the appended claims, the singular forms "a", "the", and "such" are intended to include the plural forms as well, unless the context clearly dictates otherwise.

In a wireless network, access points (APs) or stations (STAs) are included, each AP and STAs associated therewith form a basic service set (BSS), and there are a plurality of APs in the wireless network. In a new generation of a wireless local area network (WLAN) supporting a multi-AP operation, there is an expectation for using beamforming when a plurality of APs are associated for performing data transmission with a certain STA, and the STA is desired to perform channel quality measurements on channels between the STA and the APs when an interference cancellation is expected for performing data transmission between a cooperation of the APs and the certain STA. Since such APs include APs associated with the STA and/or APs unassociated with the STA, the STA is desired to obtain a plurality of channel quality results. However, in existing arts, the STA only performs channel quality measurement and channel quality result feedback on the channel between the STA and the AP associated with the STA, and a mechanism for acquiring a beamforming result or a channel quality measurement result between a STA and a plurality of APs is expected.

As shown in FIG. 1, the present disclosure provides a beamforming report transmission method applied to a first communication node, the first communication node may be an AP, and the method includes an operation S101.

At operation S101, receiving, by the first communication node, a beamforming report sent by a third communication node, where the beamforming report includes a beamforming result and/or a channel quality measurement result between the third communication node and at least one second communication node.

In some implementations, the beamforming report transmission method includes receiving, by the first communication node, the beamforming report actively sent by the third communication node.

In some implementations, the first communication node receives the beamforming report sent by the third communication node at a predefined time interval following a received channel sounding physical layer protocol data unit (PPDU), or the beamforming report sent by the third communication node after obtaining a transmission opportunity.

In some implementations, the beamforming report includes identification information of a second communication node, which is configured to indicate that the beamforming report includes a beamforming result and/or a channel quality measurement result between the third communication node and the second communication node indicated by the identification information of the second communication node.

In some implementations, the beamforming report further includes indication information of a beamforming report type, which is configured to indicate a type of the beamforming report.

The indication information of the beamforming report type is configured to indicate that, in the beamforming report, a beamforming result and/or a channel quality measurement result between the third communication node and the second communication node associated with the third communication node is carried, or a beamforming result and/or a channel quality measurement result between the third communication node and the second communication node unassociated with the third communication node is carried, or a beamforming result and/or a channel quality measurement result between the third communication node and at least one second communication node associated and/or unassociated with the third communication node is carried.

In some implementations, the beamforming report transmission method further includes sending, by the first communication node, a beamforming report request to at least one third communication node for indicating the third communication node to send the beamforming report to the first communication node.

As shown in FIG. 2, the beamforming report transmission method includes operations S100 and S101.

At operation S100, sending, by a first communication node, a beamforming report request to at least one third communication node for indicating the third communication node to send a beamforming report including a beamforming result and/or a channel quality measurement result between the third communication node and at least one second communication node to the first communication node; and at operation S101, receiving, by the first communication node, the beamforming report which includes the beamforming result and/or the channel quality measurement result between the third communication node and the at least one second communication node and sent by the third communication node.

In some implementations, the beamforming report request includes one or more of following information: identification information of a second communication node, indication information of a beamforming report type, indication information of more beamforming report requests, indication information of a feedback segment retransmission, identification information of a third communication node, or allocation information of a resource.

In some implementations, the identification information of the second communication node is configured to indicate that the beamforming report sent by the third communication node includes a beamforming result and/or a channel quality measurement result between the third communication node and the second communication node indicated by the identification information of the second communication node.

In some implementations, the identification information of the second communication node includes one or more of following information: identification information of a service set, identification information of a member of a multi-communication node group, information of a MAC address, identification information of an antenna, and information of an identification bitmap of a second communication node.

In following implementations, the first communication node is a first AP for acquiring a beamforming result and/or a channel quality result between the STA associated therewith and each corresponding AP, the third communication node is a destination STA to which a request sent by the first communication node arrives, and the second communication node is a second AP. The first AP is associated with the destination STA; the second AP may be the first AP sending the request, or may be another AP unassociated with the destination STA, the destination STA being associated with the second AP indicates that the second AP is the first AP, and the destination STA being not associated with the second AP indicates that the second AP is another AP except the first AP; and identification information of the second communication node is identification information of an AP, the beamforming report request sent by the first AP is a beamforming report request frame.

In some implementations, the beamforming report request sent by the first AP includes identification information of a second communication node, the identification information of the second communication node is identification information of an AP, and the identification information of the AP includes identification information of a service set, for example, as shown in FIG. 3, in the network shown in FIG. 3, a STA1 is associated with an AP1, the STA1 and the AP1 are located in a BSS1, an identification of the BSS1 is a BSSID1, and there are further an AP2 and an AP3 in the network, an identification of a BSS where the AP2 is located is a BSSID2, an identification of a BSS where the AP3 is located is a BSSID3, the first AP is the AP1, and the second AP may be one or more of the AP1, the AP2, or the AP3.

The AP1 sends a beamforming report request frame to a destination STA, a value of identification information of an AP included in the request frame is BSSID2 and/or BSSID3, and is used for requesting the destination STA of the request frame to send a beamforming result or a channel quality measurement result between the destination STA and the AP2 and/or between the STA and the AP3.

In a case where the destination STA is the STA1, after the STA1 receiving the beamforming report request frame, according to identification information of an AP carried in the request frame, a beamforming result between the STA1 and the AP2 and/or between the STA1 and the AP3 is carried in a beamforming report, or a channel quality measurement result between the STA1 and the AP2 and/or between the STA1 and the AP3 is carried in a beamforming report, and the STA1 sends the beamforming report to the AP1.

In some implementations, the beamforming report request frame sent by the first AP includes identification information of a second communication node, when the identification information of the second communication node is identification information of a second AP, and the identification information of the second AP includes identification information of a member of a multi-communication node group, the identification information of the member of the multi-communication node group is a member identification of the second AP indicated by the identification information of the second AP in the multi-communication node group formed by the second AP and the first AP.

For example, the STA1 is associated with the AP1, there are further the AP2 and the AP3 in the network, the AP1, the AP2 and the AP3 form a multi-communication node group, and member identifications of the AP1, the AP2 and the AP3 are ID1, ID2 and ID3, respectively.

The AP1 sends a beamforming report request frame to a destination STA, a value of identification information of an AP included in the request frame is ID2 and/or ID3, and is used for requesting the destination STA of the request frame to send a beamforming result or a channel quality measurement result between the destination STA and the AP2 and/or between the destination STA and the AP3.

In a case where the destination STA is the STA1, after the STA1 receiving the beamforming report request frame, according to identification information of an AP carried in the request frame, a beamforming result between the STA1 and the AP2 and/or between the STA1 and the AP3 is carried in a beamforming report, or a channel quality measurement result between the STA1 and the AP2 and/or between the STA1 and the AP3 is carried in a beamforming report, and the STA1 sends the beamforming report to the AP1.

In some implementations, the beamforming report request sent by the first AP includes identification information of a second communication node, when the identification information of the second communication node is identification information of an AP and the identification information of the AP includes a MAC address, in the wireless network, the STA1, the STA2 and the STA3 are associated with the AP1, and MAC addresses of the AP1, the AP2 and the AP3 are Adr1, Adr2 and Adr3, respectively.

The AP1 sends a beamforming report request frame 1, a value of identification information of an AP included in the request frame 1 is Adr1, and after receiving the request frame 1, the STA1, as a destination receiver of the request frame 1, sends a beamforming report carrying a beamforming result and/or a channel quality measurement result between the STA1 and the AP1; the AP1 sends a beamforming report request frame 2, values of identification information of an AP included in the request frame 2 are Adr2 and Adr3, and after receiving the request frame 2, the STA2, as a destination receiver of the request frame 2, sends a beamforming report carrying beamforming results and/or channel quality measurement results between the STA2 and the AP3 and between the STA2 and the AP3; and the AP1 sends a beamforming report request frame 3, values of identification information of an AP included in the request frame 3 are Adr1, Adr2 and Adr3, and after receiving the request frame 3, the STA3, as a destination receiver of the request frame 3, sends a beamforming report carrying beamforming results and/or channel quality measurement results between the STA3 and the AP1, between the STA3 and the AP2 and between the STA3 and the AP3.

It should be noted that, the AP1 described above may send one or more of the request frames 1 to 3 described above, and an sequence of sending the request frames 1 to 3 is not limited.

In some implementations, the beamforming report request includes identification information of one or more second communication nodes.

It should be noted that the identification information of the one or more second communication nodes may include identification information of a first AP or another AP except for the first AP.

In some implementations, the identification information of the second communication node is information of an identification bitmap of the second communication node, the information of the identification bitmap of the second communication node includes one or more bits, and each of the bits is mapped to one second communication node.

In some implementations, a bit of the information of the identification bitmap of the second communication node is configured to be a specific value for indicating that the third communication node sends a beamforming report including a beamforming result and/or a channel quality measurement result between the third communication node and the second communication node mapped by the bit configured to be the specific value.

Each bit of the information of the identification bitmap of the second communication node is mapped to an identification of one second communication node, when a certain bit is configured to be a specific value, for example, configured to be 1, it indicates that the third communication node is requested to send a beamforming report which includes a beamforming result and/or a channel quality measurement result between the third communication node and the second communication node mapped by the bit. Otherwise, it indicates that the beamforming report excludes a beamforming result and/or a channel quality measurement result between the third communication node and the second communication node mapped by the bit.

In a case where the identification information of the second AP is in a form of a bitmap, beamforming results and/or channel quality measurement results, between the destination STA and multiple second Aps, included in the beamforming report are sequentially arranged according to mapping positions of the second APs in the bitmap, which is not limited.

A mapping relationship between the identification bitmap of the second communication node and an identification of the second AP may be, but is not limited to: a mapping relationship predefined by a system, or a mapping relationship allocated or defined when a multi-communication node group is established by the first AP and one or more second APs, or a mapping from a bitmap i of the identification bitmap of the second communication node to an AP which uses a RU whose index is i to send a channel measurement PPDU.

The first AP receives a beamforming report, and according to identification information of one or more second communication nodes carried in the beamforming report, acquires a beamforming result and/or a channel quality measurement result between the third communication node and the second communication node indicated by the identification information of one or more second communication nodes.

Figure 5:
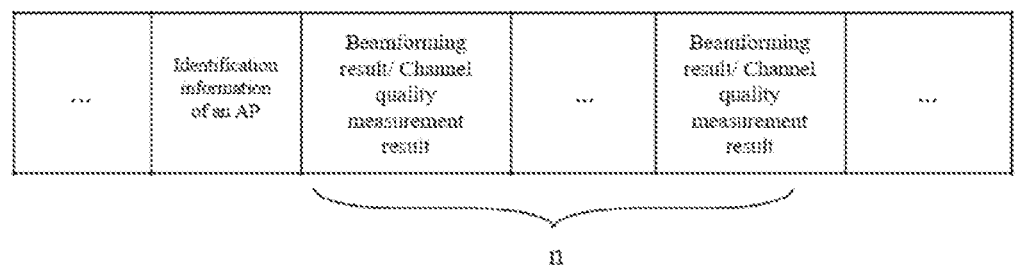
FIG. 5 is a schematic structural diagram of a beamforming report according to the present disclosure.

In some implementations, in a case where identification information of an AP is an identification bitmap of a second communication node, and the identification bitmap of the second communication node is an identification bitmap of an AP, a structure of the identification bitmap of the second communication node may be as shown in FIG. 4. The first AP receives a beamforming report, and sequentially acquires beamforming results or channel quality measurement results between the destination STA and APs corresponding to bits configured to be specific values (for example, configured to be 1) according to the identification bitmap of the AP carried in the beamforming report and a mapping relationship between the bits and the APs, for example, a bit 0 is mapped to an AP i (a point B in the FIG. 4), and a bit 7 is mapped to an AP i+7 (a point C in the FIG. 4). A structure of the beamforming report may be as shown in FIG. 5, the beamforming report includes beamforming results or channel quality measurement results between the destination STA and n APs, and a sequence of n results is consistent with a sequence of bits in the identification bitmap of the AP mapped by identifications of the APs.

In some implementations, the indication information of the beamforming report type is configured to indicate a type of the beamforming report, the type being at least one of followings: a beamforming result between the third communication node and the second communication node associated with the third communication node; a channel quality measurement result between the third communication node and the second communication node associated with the third communication node; a beamforming result between the third communication node and at least one second communication node unassociated with the third communication node; a channel quality measurement result between the third communication node and at least one second communication node unassociated with the third communication node; a beamforming result between the third communication node and at least one second communication node associated and/or unassociated with the third communication node; or a channel quality measurement result between the third communication node and at least one second communication node associated and/or unassociated with third communication node. In the implementations, in a case where the beamforming report request sent by the first AP includes indication information of the beamforming report type, the indication information of the beamforming report type is configured to indicate at least one of followings: requesting the destination STA to send a beamforming result between the destination STA and the AP associated with the STA; requesting the destination STA to send a channel quality measurement result between the destination STA and the AP associated with the STA; requesting the destination STA to send beamforming results between the destination STA and APs unassociated with the STA; requesting the destination STA to send channel quality measurement results between the destination STA and APs unassociated with the STA; requesting the destination STA to send beamforming results between the destination STA and one or more second APs associated or unassociated with the STA; or requesting the destination STA to send channel quality measurement results between the destination STA and one or more second Aps associated or unassociated with the STA;

The second APs includes an AP associated with the destination STA (i.e., the third communication node) and/or an AP unassociated with the destination STA.

The first AP sends a beamforming report request frame to the destination STA, the destination STA determines the type of the beamforming report to feed back according to indication information of a beamforming report type carried in the beamforming report request frame, and performs one or more of following operations: in response to that the beamforming report type indicates requesting the destination STA to send a beamforming result between the destination STA and the AP associated with the STA, the destination STA sends a beamforming report carrying a beamforming result between the destination STA and the first AP; in response to that the beamforming report type indicates requesting the destination STA to send a channel quality measurement result between the destination STA and the AP associated with the STA, the destination STA sends a beamforming report carrying a channel quality measurement result between the destination STA and the first AP; in response to that the beamforming report type indicates requesting the destination STA to send beamforming results between the destination STA and APs unassociated with the STA, the destination STA sends a beamforming report carrying beamforming results between the destination STA and one or more APs unassociated with the STA; in response to that the beamforming report type indicates requesting the destination STA to send channel quality measurement results between the destination STA and APs unassociated with the STA, the destination STA sends a beamforming report carrying channel quality measurement results between the destination STA and one or more APs unassociated with the STA; in response to that the beamforming report type indicates requesting the destination STA to send beamforming results between the destination STA and one or more second APs associated or unassociated with the STA, the destination STA sends a beamforming report carrying beamforming results between the destination STA and one or more second APs; or in response to that the beamforming report type indicates requesting the destination STA to send channel quality measurement results between the destination STA and one or more second APs associated or unassociated with the STA, the destination STA sends a beamforming report carrying channel quality measurement results between the destination STA and one or more second APs. For example, in the network shown in FIG. 3, the STA1 is associated with the AP1, the STA1 and the AP1 are located in the BSS1, and there are further the AP2 and the AP3 in the network.

The AP1 sends a beamforming report request frame including indication information of a beamforming report type, and the indication information indicates requesting the destination STA to send beamforming results between the destination STA and multiple second APs.

The SAT1 receives the beamforming report request frame carrying indication information of a beamforming report type, and is indicated to send a beamforming report according to the indication information which indicates to send beamforming results between the SAT1 and multiple second APs, for example, send a beamforming report carrying bamforming results between the STA1 and the AP1, between the STA1 and the AP2 and between the STA1 and the AP3.

In some implementations, the indication information of more beamforming report requests is configured to indicate whether a new beamforming report request is further to be sent from the first communication node to the third communication node during a current service period or a current transmission opportunity; for example, the indication information is configured to be 1 for indicating that another beamforming report request frame may be sent during the current service period or the current transmission opportunity; or the indication information is configured to be 0 for indicating that no beamforming report request frame would be sent during the current service period or the current transmission opportunity.

The first communication node sends the beamforming report request to the third communication node, and the third communication node determines whether to enter a sleep state during the current service period or the current transmission opportunity according to the indication information of more beamforming report requests in the beamforming report request, for example, in a case where the indication information indicates that another beamforming report request frame may be sent during the current service period or the current transmission opportunity, the third communication node is desired to keep in a wake state during the current service period or the current transmission opportunity; or in a case where the indication information indicates that no beamforming report request frame would be sent during the current service period or the current transmission opportunity, the third communication node may enter a sleep state during the current service period or the current transmission opportunity.

In some implementations, the indication information of the feedback segment retransmission is configured to indicate that the beamforming report sent by the third communication node is desired to include a feedback segment of a beamforming result and/or a feedback segment of a channel quality measurement result indicated by the indication information of the feedback segment retransmission; the indication information of the feedback segment retransmission may be a bitmap including one or more bits, each of the bits is mapped to one feedback segment, and the feedback segment refers to a segment of the beamforming report. In a case where a bit i of the indication information of the feedback segment retransmission is configured to be a specific value, for example, configured to be 1, the destination STA is requested to send a corresponding segment of the beamforming report, and thus the beamforming report sent by the destination STA includes a specific feedback segment of a beamforming result and/or a specific feedback segment of a channel quality measurement result.

In some examples, the beamforming report request may further carry identification information of a second communication node, and by including the identification information of the second communication node and the indication information of the feedback segment retransmission in the beamforming report, the first communication node requests the third communication node to send a corresponding segment (i.e., a segment indicated by the indication information of the feedback segment retransmission) of the beamforming report between the third communication node and the second communication node indicted by the identification information of the second communication node, and one or more sets of identification information of the second communication node and the indication information of the feedback segment retransmission may be included in the beamforming report request frame.

In some implementations, the allocation information of the resource is configured to indicate a RU of the third communication node for sending the beamforming report.

The allocation information of the resource is formed of one or more sets of allocation information, and each set of the allocation information includes identification information of an AP and/or identification information of a RU. Each set of the allocation information is used to indicate that the resource allocated for the destination STA is a RU identified by the identification information of the RU, which is used to send a beamforming result or a channel quality measurement result between the destination STA and the AP indicated by the identification information of the AP. The identification information of the AP may include, but is not limited to, at least one of followings: identification information of a service set, an identification information of a member of a multi-communication node group, identification information of an antenna, information of a MAC address, or an identification bitmap of an AP; and the identification information of the RU includes, but is not limited to, at least one of followings: a size of the RU, an index of the RU, and uplink/downlink bandwidth information.

Figure 6:
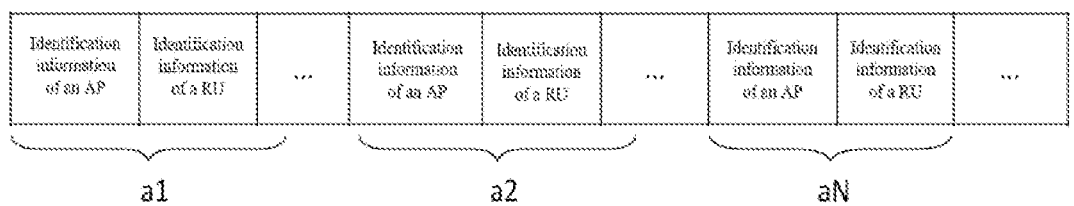
FIG. 6 is a schematic structural diagram of allocation information of a resource according to the present disclosure.

A structure of the allocation information of the resource may be, but is not limited to, that shown in FIG. 6, in which a1, a2, . . . , aN, each including identification information of an AP and identification information of a RU, are sequentially arranged. After receiving the beamforming report request frame, the destination STA sends a beamforming result or a channel quality measurement result between the destination STA and the AP indicated by the identification information of the AP through the RU identified by identification information of the RU according to the allocation information of the resource in the request frame.

In some implementations, identification information of the third communication node is configured to indicate the third communication node which is desired to send the beamforming report.

In a case where the beamforming report request sent by the first communication node includes identification information of a third communication node, it indicates that the third communication node indicated by the identification information of the third communication node is desired to send a beamforming report including beamforming results and/or channel quality measurement results between the third communication node and one or more second communication nodes.

In some implementations, the beamforming report request is sent in a form of unicast or broadcast or multicast.

Based on a same technical concept, the present disclosure further provides a computer-readable storage medium having a computer program stored thereon, when the computer program is executed by a processor, the processor performs the beamforming report transmission method described above.

Figure 7:
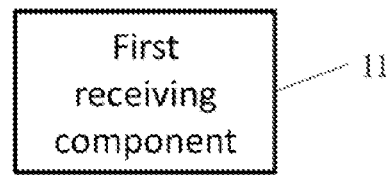
FIG. 7 is a schematic structural diagram of a communication node according to the present disclosure.

Referring to FIG. 7, FIG. 7 is a schematic structural diagram of a communication node according to the present disclosure, as shown in FIG. 7, the communication node includes: a first receiving component 11 configured to receive a beamforming report sent by a third communication node, where the beamforming report includes a beamforming result and/or a channel quality measurement result between the third communication node and at least one second communication node.

Figure 8:
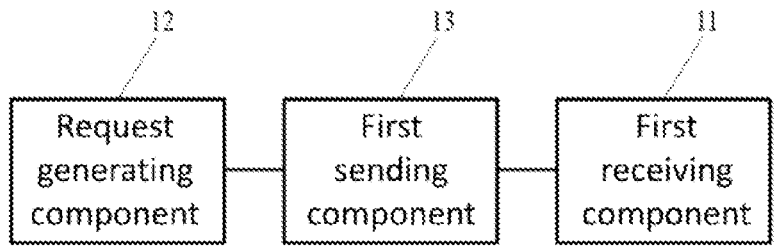
FIG. 8 is a schematic structural diagram of a communication node according to the present disclosure.

In some implementations, as shown in FIG. 8, the communication node further includes: a request generating component 12 configured to generate a beamforming report request for acquiring a beamforming result and/or a channel quality measurement result between the third communication node and at least one second communication node, and send the beamforming report request to a first sending component 13; and the first sending unit 13, configured to send the beamforming report request to at least one third communication node for indicating the third communication node to send the beamforming report including the beamforming result and/or the channel quality measurement result between the third communication node and at least one second communication node to the first receiving component 11 according to the beamforming report request.

A communication node sending the beamforming report request is called a first communication node, and the first communication node sends the beamforming report request to the third communication node, so as to acquire a beamforming result and/or a channel quality measurement result between the third communication node associated with the first communication node and each corresponding second communication node. The first communication node expects to acquire a beamforming result and/or a channel quality measurement result between the second communication node and the third communication node, and in some cases, the second communication node may further include the first communication node.

The first communication node sends a beamforming report request to the third communication node, and the third communication node sends a beamforming report including a beamforming result and/or a channel quality measurement result between the third communication node and the second communication node indicated by the information of the beamforming report request to the first communication node according to the information of the beamforming report request.

In some implementations, the beamforming report request includes one or more of following information: identification information of a second communication node, indication information of a beamforming report type, indication information of more beamforming report requests, indication information of a feedback segment retransmission, identification information of a third communication node, or allocation information of a resource.

In some implementations, the identification information of the second communication node includes one or more of following information: identification information of a service set, identification information of a member of a multi-communication node group, information of a MAC address, identification information of an antenna, and information of an identification bitmap of a second communication node.

In some implementations, the information of the identification bitmap of the second communication node includes one or more bits, when each of the bits is mapped to one second communication node, and a value of a bit is configured to be a specific value, the information of the identification bitmap of the second communication node indicates the third communicated node to acquire a beamforming report including a beamforming result and/or a channel quality measurement result between the third communication node and the second communication node mapped by the bit, and send the beamforming report to the first communication node.

In some implementations, the indication information of more beamforming report requests indicates the third communication node to acquire whether a new beamforming report request is further to be sent from the first communication node to the third communication node during a current service period or a current transmission opportunity; the indication information of the feedback segment transmission indicates the third communication node to acquire and send a feedback segment in the beamforming report sent by the third communication node; and the allocation information of the resource indicates the third communication node to acquire a RU for sending the beamforming report between the third communication node and at least one second communication node, so that the third communication node can send the beamforming report through the RU.

Figure 9:
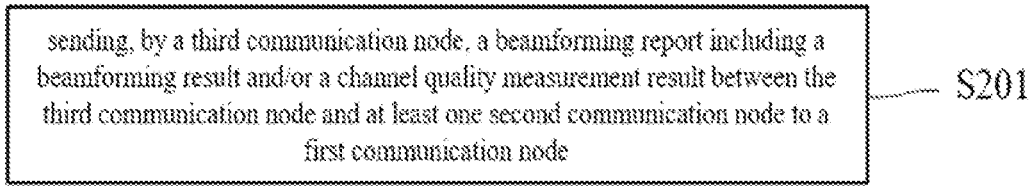
FIG. 9 is a flowchart of a beamforming report transmission method according to the present disclosure.

Based on the same technical concept, as shown in FIG. 9, FIG. 9 is a flowchart of a beamforming report transmission method according to the present disclosure, the beamforming report transmission method is applied to a third communication node and includes an operation S201.

At operation S201, sending, by the third communication node, a beamforming report including a beamforming result and/or a channel quality measurement result between the third communication node and at least one second communication node to a first communication node.

In some implementations, the third communication node sends the beamforming report actively to the first communication node.

The third communication node may send the beamforming report at a predefined time interval following a received channel sounding PPDU; or the third communication node sends the beamforming report after obtaining a transmission opportunity.

In some implementations, the beamforming report includes identification information of a second communication node and/or indication information of a beamforming report type.

The identification information of the second communication node is configured to indicate that the beamforming report includes a beamforming result and/or a channel quality measurement result between the third communication node and the second communication node indicated by the identification information of the second communication node; and the indication information of the beamforming report type is configured to indicate that, in the beamforming report, a beamforming result and/or a channel quality measurement result between the third communication node and the second communication node associated with the third communication node is carried, or a beamforming result and/or a channel quality measurement result between the third communication node and the second communication node unassociated with the third communication node is carried, or a beamforming result and/or a channel quality measurement result between the third communication node and at least one second communication node associated and/or unassociated with the third communication node is carried.

In some implementations, the beamforming report transmission method includes sending, by the third communication node, the beamforming report after receiving a beamforming report request sent by the first communication node.

Figure 10:
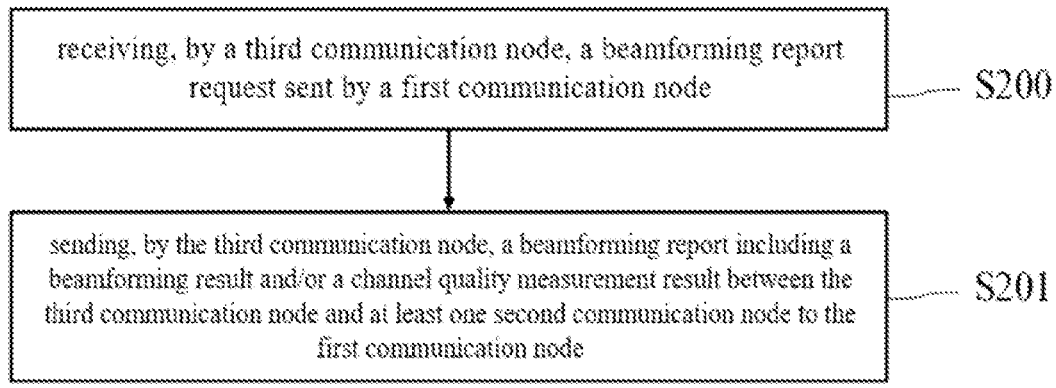
FIG. 10 is a flowchart of a beamforming report transmission method according to the present disclosure.

As shown in FIG. 10, the beamforming report transmission method may include operations S200 and S201.

At operation S200, receiving, by a third communication node, a beamforming report request sent by a first communication node; and at operation S201, sending, by the third communication node, a beamforming report including a beamforming result and/or a channel quality measurement result between the third communication node and at least one second communication node to the first communication node.

In some implementations, the beamforming report request includes one or more of following information: identification information of a second communication node, indication information of a beamforming report type, indication information of more beamforming report requests, indication information of a feedback segment retransmission, identification information of a third communication node, or allocation information of a resource.

In some implementations, according to the identification information of the second communication node, at least one of a beamforming result or a channel quality measurement result between the third communication node and the second communication node indicated by the identification information of the second communication node is carried in the beamforming report sent by the third communication node.

In some implementations, the identification information of the second communication node includes one or more of following information: identification information of a service set, identification information of a member of a multi-communication node group, information of a MAC address, identification information of an antenna, and information of an identification bitmap of a second communication node.

In following implementations, the second communication node may be the first communication node sending the request, or may be another AP unassociated with the third communication node.

In some implementations, the third communication node sends a beamforming report to the first communication node associated therewith after receiving a beamforming report request. The beamforming report includes the identification information of the second communication node, which is used to indicate that a beamforming result or a channel quality measurement result between the third communication node and the second communication node indicated by the identification information of the second communication node is carried in the beamforming report.

The beamforming report described above may include identification information of one or more second communication nodes for indicating that the beamforming report includes beamforming results or channel quality measurement results between the STA and one or more second communication nodes, and the one or more second communication nodes may include the first communication node associated with the third communication node and/or another communication node unassociated with the third communication node.

In some implementations, the third communication node may be a destination STA, the first communication node may be a first AP, and the second communication node may be a second AP.

In some implementations, the third communication node receives a beamforming report request sent by the first communication node, the beamforming report request includes identification information of a second communication node, the identification information of the second communication node is identification information of an AP, and the identification information of the AP includes identification information of a service set, the beamforming report request is a beamforming report request frame, for example, as shown in FIG. 3, in the network shown in FIG. 3, a STA1 is associated with an AP1, the STA1 and the AP1 are located in a BSS1, an identification of the BSS1 is a BSSID1, and there are further an AP2 and an AP3 in the network, an identification of a BSS where the AP2 is located is a BSSID2, an identification of a BSS where the AP3 is located is a BSSID3, the first AP is the AP1, and the second AP may be one or more of the AP1, the AP2, or the AP3.

The STA1 receives a beamforming report request sent by the AP1, a value of identification information of an AP included in the beamforming report request is BSSID2 and/or BSSID3, according to the identification information of the AP included in the beamforming report request, a beamforming result between the STA1 and the AP2 and/or between the STA1 and the AP3 is carried in the beamforming report, or a channel quality measurement result between the STA1 and the AP2 and/or between the STA1 and the AP3 is carried in the beamforming report, and the beamforming report is sent to the AP1.

Identification information of a member of a multi-communication node group is a member identification of the second AP indicated by the identification information of the AP in the multi-communication node group formed by the second AP and the first AP.

In some implementations, when the destination STA receives a beamforming report request frame, sent by the first AP, including identification information of a second AP, and the identification information of the second AP includes information of a member of a multi-communication node group, for example, the STA1 is associated with the AP1, there are further the AP2 and the AP3 in the network, the AP1, the AP2 and the AP3 form a multi-communication node group, and member identifications of the AP1, the AP2 and the AP3 are ID1, ID2 and ID3, respectively.

The destination STA1 receives a beamforming report request frame sent by the AP1, a value of identification information of an AP included in the request frame is ID2 and/or ID3, according to the identification information of the AP included in the beamforming report request frame, a beamforming result between the STA1 and the AP2 and/or between the STA1 and the AP3 is carried in the beamforming report, or a channel quality measurement result between the STA1 and the AP2 and/or between the STA1 and the AP3 is carried in the beamforming report, and the beamforming report is sent to the AP1.

In some implementations, when the destination STA receives a beamforming report request frame, sent by the first AP, including identification information of a second AP, and the identification information of the second AP includes a MAC address, in a wireless network, the STA1, the STA2 and the STA3 are associated with the AP1, and MAC addresses of the AP1, the AP2 and the AP3 are Adr1, Adr2 and Adr3, respectively.

The destination STA1 receives a beamforming report request frame 1 sent by the AP1, a value of identification information of an AP included in the request frame 1 is Adr1, after receiving the request frame 1, the STA1 sends a beamforming report carrying a beamforming result and/or a channel quality measurement result between the STA1 and the AP1 to the AP1; the destination STA2 receives a beamforming report request frame 2 sent by the AP1, values of identification information of an AP included in the request frame 2 are Adr2 and Adr3, after receiving the request frame 2, the STA2 sends a beamforming report carrying beamforming results and/or channel quality measurement results between the STA2 and the AP2 and between the STA2 and the AP3 to the AP1; the destination STA3 receives a beamforming report request frame 3 sent by the AP1, values of identification information of an AP included in the request frame 3 are Adr1, Adr2 and Adr3, and after receiving the request frame 3, the STA2 sends a beamforming report carrying beamforming results and/or channel quality measurement results between the STA2 and the AP1, between the STA2 and the AP2 and between the STA2 and the AP3 to the AP1.

In some implementations, the beamforming report described above includes identification information of one or more second communication nodes.

It should be noted that the identification information of one or more second communication nodes may include identification information of the first communication node or another communication node expect for the first communication node.

In some implementations, the information of the identification bitmap of the second communication node includes one or more bits, and each of the bits is mapped to one second communication node.

In some implementations, in a case where a bit of the information of the identification bitmap of the second communication node is configured to be a specific value, a beamforming result and/or a channel quality measurement result between the third communication node and the second communication node mapped by the bit configured to be the specific value is carried in the beamforming report sent by the third communication node.

In some implementations, the destination STA receives a beamforming report request frame, sent by the first AP, including identification information of an AP, and the identification information of the AP includes information of an identification bitmap of a second communication node, the information of the identification bitmap of the second communication node includes one or more bits, each of the bits is mapped to one AP. In a case where a bit is configured to be a specific value, for example, configured to be 1, it indicates that a beamforming report sent by the destination STA includes a beamforming result and/or a channel quality measurement result between the destination STA and the AP mapped by the bit. Otherwise, it indicates that the beamforming report excludes a beamforming result and/or a channel quality measurement result between the destination STA and the AP mapped by the bit. In a case where the identification information of an AP is in a form of a bitmap, beamforming results and/or channel quality measurement results between the destination STA and multiple second APs included in the beamforming report are sequentially arranged according to mapping positions of the APs in the bitmap, which is not limited. A mapping relationship between the information of the identification bitmap of the second communication node and the identification information of the AP may be, but is not limited to, a mapping relationship predefined by a system, or a mapping relationship allocated or defined when a multi-communication node group is established by the first AP and one or more second APs, or a mapping of a bitmap i of the identification bitmap of the AP to an AP which uses a RU whose index is i to send a channel measurement PPDU.

The destination STA sends a beamforming report to the first AP, and the first AP acquires beamforming results or channel quality measurement results between the destination STA and the APs identified by the identification information of one or more Aps, respectively, according to identification information of an AP carried in the beamforming report.

In some implementations, according to the indication information of the beamforming report type, in the beamforming report sent by the third communication node, a beamforming result or a channel quality measurement result between the third communication node and the second communication node associated with the third communication node is carried, or a beamforming result or a channel quality measurement result between the third communication node and the second communication node unassociated with the third communication node is carried, or a beamforming result or a channel quality measurement result between the third communication node and at least one second communication node associated and/or unassociated with the third communication node is carried.

For example, in the network shown in FIG. 3, the STA1 is associated with the AP1, the STA1 and the AP1 are located in the BSS1, and there are further the AP2 and the AP3 in the network.

The STA1 receives a beamforming report request frame sent by the AP1, the request frame includes indication information of a beamforming report type, and the indication information indicates to request the STA1 to send beamforming results between the STA1 and multiple second APs. The STA1 sends a beamforming report according to the indication information which indicates to send beamforming results between the STA1 and multiple second APs, for example, sends a beamforming report carrying bamforming results between the STA1 and the AP1, between the STA1 and the AP2 and between the STA1 and the AP3.

In some implementations, the third communication node acquires whether a new beamforming report request is to be sent from the first communication node to the third communication node during a current service period or a current transmission opportunity, according to the indication information of more beamforming report requests.

In some implementations, according to the indication information of the feedback segment retransmission, a feedback segment of a beamforming result and/or a feedback segment of a channel quality measurement result is carried in a beamforming report sent by the third communication node.

In some implementations, according to the allocation information of the resource, the third communication node sends a beamforming report including a beamforming result and/or a channel quality measurement result between the third communication node and at least one second communication node through a corresponding RU.

The destination STA acquires whether more beamforming report request frames exist in a current service period or a current transmission opportunity according to the received indication information of more beamforming report requests. For example, in a case where the indication information is configured to be 1, the destination STA acquires that more beamforming report request frames may be sent during the current service period or the current transmission opportunity; or in a case where the indication information is configured to be 0, the destination STA acquires that no new beamforming report request frame would be sent during the current service period or the current transmission opportunity.

The destination STA receives the beamforming report request frame, and determines whether to enter a sleep state during the current service period or the current transmission opportunity according to the indication information of more beamforming report requests in the beamforming report request frame, for example, in a case where the indication information indicates that more beamforming report request frames may be sent during the current service period or the current transmission opportunity, the destination STA is desired to keep in a wake state during the current service period or the current transmission opportunity; or in a case where the indication information indicates that no new beamforming report request frame would be sent during the current service period or the current transmission opportunity, the destination STA may choose to enter a sleep state during the current service period or the current transmission opportunity.

The indication information of the feedback segment retransmission may be a bitmap including one or more bits, each of the bits is mapped to one feedback segment, and the feedback segment refers to a segment of the beamforming report. In a case where a bit i of the indication information of the feedback segment retransmission is configured to be a specific value, for example, configured to be 1, and the destination STA sends a corresponding segment of the beamforming report, so that a specific feedback segment of a beamforming result and/or a specific feedback segment of a channel quality measurement result is included in the beamforming report sent by the destination STA.

In some examples, the identification information of the AP is carried in the beamforming report request frame, according to the identification information of the AP and the indication information of the feedback segment retransmission, the destination STA sends a corresponding segment (i.e., a segment indicated by the indication information of the feedback segment retransmission) of the beamforming report between the destination STA and the AP indicated by the identification information of the AP, the beamforming report request frame may include a plurality of sets of information (i.e., each set including the identification information of the AP and the indication information of the feedback segment retransmission).

In some implementations, the beamforming report transmission method further includes: determining, by a destination STA, whether to send the beamforming report, according to the identification information of the third communication node.

In a case where the destination STA receives the beamforming report request frame, sent by a first AP, including identification information of the third communication node, the destination STA indicated by the identification information of the third communication node sends a beamforming report including beamforming results and/or channel quality measurement results between the destination STA and one or more second APs to the first AP.

In some implementations, identification information of one or more APs may be carried in signaling of a physical frame header or a MAC header.

Figure 11:
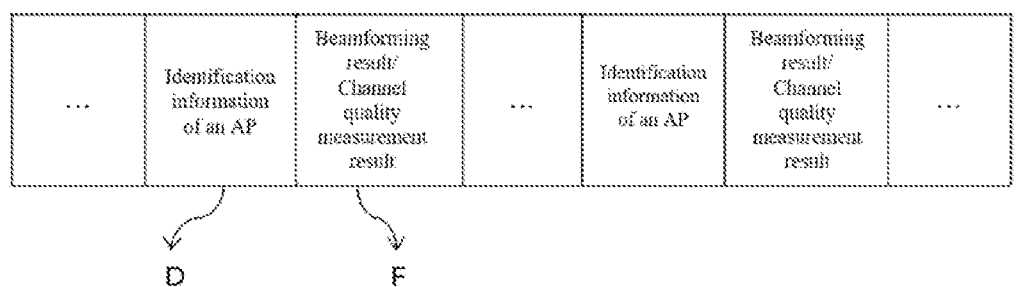
FIG. 11 is a schematic structural diagram of a beamforming report according to the present disclosure.

In some implementations, one beamforming report may include one or more AP information domains, each of the AP information domains includes identification information of an AP and a beamforming result and/or a channel quality measurement result, and the beamforming result and/or the channel quality measurement result is a beamforming result and/or a channel quality measurement result between the STA and the AP indicated by the identification information of the AP. For example, a possible structure of the beamforming report is shown in FIG. 11, D shown in FIG. 11 denotes identification information i of an AP, F shown in FIG. 11 denotes a beamforming result and/or a channel quality measurement result between the STA and the AP indicated by the identification information i. The beamforming report includes one or more AP information domains, each of the AP information domains includes a beamforming result and/or a channel quality measurement result between the STA and the AP indicated by the identification information of the AP.

In some implementations, in a case where identification information of an AP is an identification bitmap of a second communication node, a structure of the identification bitmap of the second communication node may be as shown in FIG. 4. The first AP receives a beamforming report, and according to the identification bitmap of the second communication node carried in the beamforming report and a mapping relationship between the bits in the identification bitmap and APs, sequentially acquires beamforming results or channel quality measurement results between the destination STA and the APs corresponding to the bits configured to be specific values (for example, configured to be 1), a structure of the beamforming report may be as shown in FIG. 5, the beamforming report includes beamforming results or channel quality measurement results between the destination STA and n APs, and a sequence of n results is consistent with a sequence of the bits in the identification bitmap of the AP mapped by the identification information of the AP.

In some implementations, the first AP or the STA allocates a RU for one or more APs sending channel measurement PPDU, and an index of the RU used by each AP for sending channel measurement PPDU is i (i=0, 1, . . . , N); after performing beamforming or channel measurement with the one or more APs, the STA sends a beamforming report to the first AP, a bit i (i=0, 1, . . . , N) in an identification bitmap of a second communication node carried in the beamforming report is mapped to an AP which uses the RU whose index is i to send a channel measurement PPDU. When a bit j (j=0, 1, . . . , N) is configured to be a specific value, for example, configure to be 1, it indicates that the beamforming report includes a beamforming result or a channel quality measurement result between the STA and the AP which uses the RU whose index is j to send a channel measurement PPDU. For example, in a case where an AP i uses the RU whose index is i to send the channel measurement PPDU, and a beamforming report sent by the STA includes a beamforming result or a channel quality measurement result between the STA and the AP i, a value of the bit i in the identification bitmap of the second communication node is configured to be 1. The first AP receives the beamforming report, and according to the value of the bit i, which is configured to be 1, in the second communication node bitmap, knows that the beamforming report includes a beamforming result or a channel quality measurement result between the destination STA and the AP i, and thus acquires the corresponding beamforming result or the corresponding channel quality measurement result according to a position of the bit i, whose value is configured to be 1, in the bitmap.

In some implementations, the number N of the beamforming results may be carried in the beamforming report, so as to indicate that the beamforming report includes beamforming results or channel quality measurement result between the STA and N APs.

Based on same technical concept, the present disclosure further provides a computer-readable storage medium having a computer program stored thereon, when the computer program is executed by a processor, the processor performs the beamforming report transmission method described above.

Figure 12:
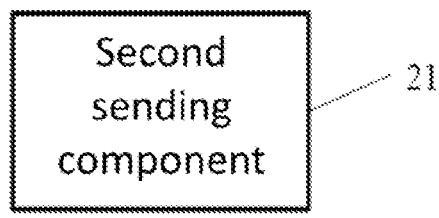
FIG. 12 is a schematic structural diagram of a communication node according to the present disclosure.

Referring to FIG. 12, FIG. 12 is a schematic structural diagram of a communication node according to the present disclosure, as shown in FIG. 12, the communication node includes: a second sending component 21 configured to send a beamforming report including a beamforming result and/or a channel quality measurement result between the communication node and at least one second communication node to a first communication node.

Figure 13:
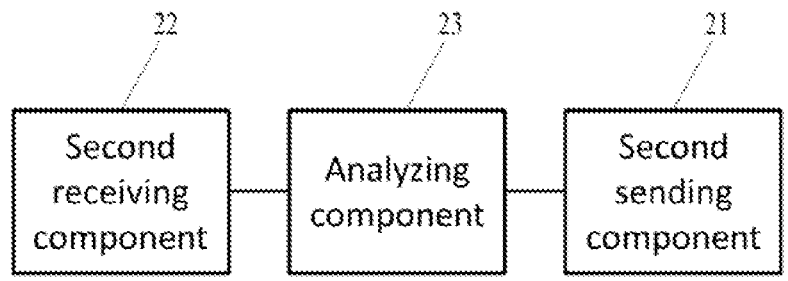
FIG. 13 is a schematic structural diagram of a communication node according to the present disclosure.

In some implementations, as shown in FIG. 13, the communication node further includes: a second receiving component 22 configured to receive a beamforming report request sent by the first communication node, the beamforming report request is used for acquiring a beamforming result and/or a channel quality measurement result between the communication node and at least one second communication node; an analyzing component 23 configured to analyze the beamforming report request received by the second receiving component 22; and the second sending component 21 is further configured to send the beamforming report to the first communication node according to a result analyzed by the analyzing component 23.

In the present disclosure, the description of each implementation has its own emphasis, and for parts that are not described in detail in some certain implementations, reference may be made to the related descriptions of other implementations.

In addition, functional components in the present disclosure may be integrated into one processor, or each component may exist alone physically, or two or more components are integrated into one component. The integrated component may be implemented in a form of hardware, or may further be implemented in a form of a software functional element.

When the above components are implemented in a form of a single software function and are sold or used as independent products, the above components may be stored in a computer-readable storage medium. Based on such understanding, the technical solution of the present disclosure essentially or partly contributing to existing arts or all or part of the technical solution may be embodied in a form of a software product, which is stored in a storage medium and includes several instructions for causing a computer device (which may be a personal computer, a server, or a network device, etc.) to execute all or part of steps of the method according to the present disclosure. The aforementioned storage medium includes: an U-disk, a read-only memory (ROM), a random access memory (RAM), a removable hard disk, a magnetic disk, or an optical disk, and various medium capable of storing program codes.

It should be understood that the above implementations are merely exemplary implementations adopted to illustrate a principle of the present disclosure, but the present disclosure is not limited thereto. For those skilled in the art, without departing from spirit and essence of the present disclosure, various modifications and improvements may be made, and these modifications and improvements are regarded as within the protection scope of the present disclosure.

What is claimed is:

1. A beamforming report transmission method performed by a first communication node, comprising:
receiving, by the first communication node, a beamforming report sent by a third communication node, the beamforming report comprising at least one of a beamforming result or a channel quality measurement result between the third communication node and at least one second communication node, wherein the first communication node is an access point, and the third communication node is a station associated with the first communication node;
sending, by the first communication node, a beamforming report request to the third communication node for indicating the third communication node to send the beamforming report to the first communication node;
wherein the beamforming report request comprises all of following information:
identification information of each of the at least one second communication node,
indication information of a beamforming report type, indication information of more beamforming report requests, indication information of a feedback segment retransmission, identification information of the third communication node, and allocation information of a resource,
wherein the indication information of more beamforming report requests is configured to indicate whether a new beamforming report request is to be sent from the first communication node to the third communication node during a current service period or a current transmission opportunity;
wherein the indication information of the feedback segment retransmission is configured to indicate that the beamforming report sent by the third communication node comprises at least one of a feedback segment of the beamforming result or a feedback segment of the channel quality measurement result, which is indicated by the indication information of the feedback segment retransmission;

wherein the indication information of the third communication node is configured to indicate the third communication node for sending the beamforming report; and wherein the allocation information of the resource is configured to indicate a resource unit of the third communication node for sending the beamforming report.

2. The method of claim 1, wherein the beamforming report comprises at least one of: identification information of each of the at least one second communication node; or indication information of a beamforming report type.

3. The method of claim 2, wherein, the identification information of each of the at least one second communication node is configured to indicate that the beamforming report comprises at least one of a beamforming result or a channel quality measurement result between the third communication node and said each of the at least one second communication node indicated by the identification information; and the indication information of the beamforming report type is configured to indicate that, in the beamforming report, at least one of a beamforming result or a channel quality measurement result between the third communication node and at least one second communication node associated with the third communication node is carried, or at least one of a beamforming result or a channel quality measurement result between the third communication node and at least one second communication node unassociated with the third communication node is carried, or at least one of a beamforming result or a channel quality measurement result between the third communication node and at least one second communication node associated and/or unassociated with the third communication node is carried.

4. The method of claim 1, wherein the identification information of each of the at least one second communication node is configured to indicate that the beamforming report sent by the third communication node comprises at least one of a beamforming result or a channel quality measurement result between the third communication node and said each of the at least one second communication node indicated by the identification information.

5. The method of claim 2, wherein the identification information of each of the at least one second communication node comprises at least one of following information: identification information of a service set, identification information of a member of a multi-communication nodes group, information of a MAC address, identification information of an antenna, and information of an identification bitmap of the at least one second communication node.

6. The method of claim 5, wherein the identification information of each of the at least one second communication node comprises the information of the identification bitmap of the at least one second communication node, and the information of the identification bitmap of the at least one second communication node comprises at least one bit, wherein each bit is mapped to one second communication node, wherein a bit of the information of the identification bitmap of the at least one second communication node is configured to be a specific value for indicating the third communication node to send the beamforming report comprising at least one of the beamforming result or the channel quality measurement result between the third communication node and one of the at least one second communication node mapped by the bit configured to be the specific value.

7. The method of claim 1, wherein the indication information of the beamforming report type is configured to indicate a type of the beamforming report, and the type is at least one of:

a beamforming result between the third communication node and at least one second communication node associated with the third communication node;

a channel quality measurement result between the third communication node and at least one second communication node associated with the third communication node;

a beamforming result between the third communication node and at least one second communication node unassociated with the third communication node;

a channel quality measurement result between the third communication node and at least one second communication node unassociated with the third communication node;

a beamforming result between the third communication node and at least one second communication node associated and/or unassociated with the third communication node; or a channel quality measurement result between the third communication node and at least one second communication node associated and/or unassociated with the third communication node.

8. A beamforming report transmission method performed by a third communication node, comprising:

sending, by the third communication node, a beamforming report comprising at least one of a beamforming result or a channel quality measurement result between the third communication node and at least one second communication node to a first communication node, wherein the first communication node is an access point, and the third communication node is a station associated with the first communication node;

sending, by the third communication node, the beamforming report, after receiving a beamforming report request sent by the first communication node;

wherein the beamforming report request comprises all of following information:

identification information of each of the at least one second communication node, indication information of a beamforming report type, indication information of more beamforming report requests, indication information of a feedback segment retransmission, identification information of the third communication node, and allocation information of a resource;

and acquiring, by the third communication node, whether a new beamforming report request is to be sent from the first communication node to the third communication node during a current service period or a current transmission opportunity according to the indication information of more beamforming report requests;

according to the indication information of the feedback segment retransmission, at least one of a feedback segment of the beamforming result or a feedback segment of the channel quality measurement result indicated by the indication information of the feedback segment retransmission is carried in the beamforming report sent by the third communication node;

determining, by the third communication node, whether to send the beamforming report according to the identification information of the third communication node; and sending, by the third communication node, the beamforming report comprising at least one of the beamforming result or the channel quality measurement result between the third communication node and at least one second communication node through a corresponding resource unit according to the allocation information of the resource.

9. The method of claim 8, wherein the beamforming report comprises at least one of: identification information of each of the at least one second communication node; or indication information of a beamforming report type.

10. The method of claim 9, wherein, the identification information of each of the at least one second communication node is configured to indicate that the beamforming report comprises at least one of the beamforming result or the channel quality measurement result between the third communication node and said each of the at least one second communication node indicated by the identification information; and the indication information of the beamforming report type is configured to indicate that, in the beamforming report, at least one of the beamforming result or the channel quality measurement result between the third communication node and at least one second communication node associated with the third communication node is carried, or at least one of the beamforming result or the channel quality measurement result between the third communication node and at least one second communication node unassociated with the third communication node is carried, or at least one of the beamforming result or the channel quality measurement result between the third communication node and at least one second communication node associated and/or unassociated with the third communication node is carried.

11. The method of claim 8, wherein according to the identification information of each of the at least one second communication node, at least one of the beamforming result or the channel quality measurement result between the third communication node and said each of the at least one second communication node indicated by the identification information is carried in the beamforming report sent by the third communication node.

12. The method of claim 9, wherein the identification information of each of the at least one second communication node comprises at least one of following information: identification information of a service set, identification information of a member of a multi-communication nodes group, information of a MAC address, identification information of an antenna, and information of an identification bitmap of the at least one second communication node.

13. The method of claim 12, wherein the identification information of each of the at least one second communication node comprises the information of identification bitmap of the at least one second communication node, and the information of the identification bitmap of the at least one second communication node comprises at least one bit, wherein each bit is mapped to one second communication node, wherein in response to that a bit of the information of the identification bitmap of the at least one second communication node is configured to be a specific value, at least one of the beamforming result or the channel quality measurement result between the third communication node and one of the at least one second communication node mapped by the bit configured to be the specific value is carried in the beamforming report sent by the third communication node.

14. The method of claim 8, wherein according to the indication information of the beamforming report type, in the beamforming report sent by the third communication node, the beamforming result or the channel quality measurement result between the third communication node and at least one second communication node associated with the third communication node is carried, or the beamforming result or the channel quality measurement result between the third communication node and at least one second communication node unassociated with the third communication node is carried, or the beamforming result or the channel quality measurement result between the third communication node and at least one second communication node associated and/or unassociated with the third communication node is carried.

* * * * *